3,495,001
EFFERVESCENT COMPOSITIONS OF ACETYLSALICYLIC ACID
Jack Ralph Leonards, Cleveland Heights, Ohio, assignor to Miles Laboratories, Inc., Elkhart, Ind., a corporation of Indiana
No Drawing. Continuation-in-part of application Ser. No. 564,028, July 11, 1966. This application May 27, 1968, Ser. No. 732,090
Int. Cl. A61k 27/00
U.S. Cl. 424—44    7 Claims

ABSTRACT OF THE DISCLOSURE

An effervescent analgesic composition has been developed for use in prolonged therapy at elevated analgesic levels, such as in the treatment of arthritis. This composition, which does not have undesirable side effects, is capable of reacting in water to form a mixture of sodium-free alkaline salts of acetylsalicylic acid and sodium-free alkaline salts of polybasic organic acids. This aqueous analgesic mixture is then ingested by a patient in analgesic dosage levels equivalent to from about 645 to about 1300 milligrams of acetylsalicylic acid.

---

This application is a continuation-in-part of my application Ser. No. 564,028, filed July 11, 1966, now abandoned.

BACKGROUND AND PRIOR ART

Acetylsalicylic acid, or aspirin, is well known as an effective and safe analgesic drug. It is also known that acetylsalicylic acid can cause bleeding from the gastrointestinal tract. This can become quite a problem when acetylsalicylic acid is administered in relatively large doses over an extended period of time, as is often required in the treatment of rheumatoid arthritis, for example. This undesirable bleeding condition can be and has been alleviated by administering the drug in the form of an aqueous solution of a mixture of alkaline salts of acetylsalicylic acid, alkaline salts of citric acid and other alkaline buffering salts. The prior art effervescent compositions which were dissolved in water to form the above solution contained appreciable amounts of sodium salts. The resulting overall buffering action was such that when larger amounts of the overall composition were employed to attempt to achieve an increased analgesic dose into the body and thus increase the total salicylate level in the blood stream, the buffering action caused by the sodium salts was effective to increase the excretion of salicylate and to actually reduce the overall salicylate blood levels rather than to increase such levels. Since the desired analgesic and anti-inflammatory action is substantially directed related to blood salicylate levels, this reduction in such levels is undesirable.

DESCRIPTION OF THE INVENTION

In accordance with the present invention, a substantially water-soluble effervescent analgesic composition is provided which is useful for prolonged therapy at elevated analgesic levels and which is capable of reacting in water to form a mixture of sodium-free alkaline salts of acetylsalicylic acid and sodium-free alkaline salts of polybasic organic acids, said composition comprising acetylsalicylic acid, a polybasic organic acid, and a sodium-free alkaline compound selected from the class consisting of alkali metal bicarbonates, alkali metal carbonates, alkaline earth carbonates and mixtures thereof, said sodium-free alkaline compound being present in an amount sufficient to react in water with the acetylsalicylic acid and the polybasic organic acid to form said sodium-free alkaline salts of said acids. The ingredients of the above composition are present in sufficient amounts to also provide a solution pH of from about 4.5 to about 7.5. Preferably, the polybasic organic acid is present in an amount from about 0.25 to about 0.9 mole per mole of acetylsalicylic acid.

The above analgesic composition when reacted in water is used in analgesic dosage levels equivalent to from about 645 to about 1300 milligrams of acetylsalicylic acid. The individual portions of the above analgesic composition which are individually or collectively reacted in water to achieve the above dosage levels contain from about 320 to about 1300 milligrams of acetylsalicylic acid.

The polybasic organic acids useful in the present invention are exemplified by citric acid, tartaric acid, malic acid, fumaric acid, maleic acid, succinic acid, malonic acid and the like.

The sodium-free alkaline compounds useful in the present invention are exemplified by alkali metal bicarbonates, such as lithium bicarbonate, potassium bicarbonate and the like; alkali metal carbonates, such as lithium carbonate, potassium carbonate and the like; and alkaline earth carbonates, such as magnesium carbonate, calcium carbonate and the like; and mixtures thereof.

If desired, the compositions of the present invention can also contain flavorings, such as lemon, grapefruit and the like, and sweeteners, such as cyclamates and saccharin salts.

The invention will be described in further detail in the following examples.

EXAMPLE 1

Several portions of an effervescent analgesic composition identified by the code "Formula K" were prepared, each portion individually containing:

| | Mg. |
|---|---|
| Acetylsalicylic acid | 325 |
| Citric Acid, anhydrous | 286 |
| Calcium carbonate | 300 |
| Magnesium carbonate | 125 |

This composition contained in gredients in the molar proportional amounts of one mole of acetylsalicylic acid, 0.83 mole of citric acid, 1.67 moles of calcium carbonate, and 0.82 mole of magnesium carbonate. When it was reacted in water, it provided a solution pH of 5.22.

Three portions of the above "Formula K" were added to water and reacted to form a total analgesic dosage level equivalent to 975 mg. of acetylsalicylic acid. This aqueous mixture was the ingested by a human subject in the morning after breakfast. An equivalent amount of "Formula K" reacted in water was also ingested by each of two other human subjects. Blood salicylate levels for each of the subjects were measured after 15, 30 and 45 minutes. The same overall dosage level was repeated for each subject at noon, at 6 P.M. and at midnight. At 8 A.M. the next morning, before breakfast, blood salicylate levels were measured for each subject. The results represented 24 hours of analgesic treatment at an elevated dosage level. The subjects then had breakfast. After breakfast, the subjects each received "Formula K" reacted in water at the above dosage level. This dosage was repeated for each subject at noon, at 6 P.M. and at midnight. At 8 A.M. the next morning, before breakfast, blood salicylate levels were measured for each subject. The results represented 48 hours of analgesic treatment at an elevated dosage level.

The results of the above tests are shown in the following table wherein the results each represent the numerical average value for the three subjects:

Blood salicylate levels:                      Mg./liter
    15 min. ------------------------------------- 19
    30 min. ------------------------------------- 43
    45 min. ------------------------------------- 58
    24 hr. -------------------------------------- 71
    48 hr. -------------------------------------- 73

The above results clearly show that the composition of the present invention enables blood salicylate levels to be quickly built-up and that such high levels can be maintained through prolonged treatment, such as in arthritis therapy. None of the subjects experienced any gastrointestinal bleeding.

Example 2

Several portions of an effervescent analgesic composition identified by the code "P–1" were prepared, each portion individually containing:

Mg.
Acetylsalicylic acid ---------------------------- 648
Citric acid, anhydrous -------------------------- 2055.8
Magnesium carbonate ----------------------------- 538.1
Calcium carbonate ------------------------------- 1277.2
Mixture of lemon and grapefruit flavorings and
    saccharin sweeteners ------------------------ 204.5

This composition contained 2.98 moles of citric acid per mole of acetylsalicylic acid and when reacted in water provided a solution of pH of 4.5.

A single portion of composition "P–1" reacted in water was given to each of three human subjects at 9 A.M., noon, 3 P.M., 6 P.M., 9 P.M. and midnight. The blood salicylate levels for each subject were measured 15, 30 and 45 minutes after receiving the first dose and before breakfast the next morning. The above dosages were repeated for each subject for another day. The blood salicylate levels were then measured for each subject.

A week later the above treatment schedule was repeated for the same human subjects employing as the analgesic composition a commercially available sodium-containing effervescent material having an individual portion composition of:

Mg.
Acetylsalicylic acid ---------------------------- 325
Citric acid, anhydrous -------------------------- 1024
Sodium bicarbonate ------------------------------ 1920
Mono-calcium phospate --------------------------- 192

This product, identified as "Commercial", contains 2.97 moles of citric acid per mole of acetylsalicylic acid. Each individual subject received two of the above portions dissolved in water for each analgesic ingestion. The total equivalent acetylsalicylic acid dosage of about 650 mg. per ingestion for each subject for the "P–1" and "Commercial" tests was the same.

The results of the above tests are shown in the following table wherein the results each represent the numerical average value for the three subjects:

| Composition | Blood Salicylate Levels, mg./liter | | | | |
|---|---|---|---|---|---|
| | 15 min. | 30 min. | 45 min. | 24 hr. | 48 hr |
| P–1 | 22 | 34 | 41 | 66 | 85 |
| Commercial | 19 | 43 | 50 | 43 | 42 |

The above results clearly show that a sodium-free composition of the present invention enables blood salicylate levels to be maintained at a significantly higher level during prolonged therapy as contrasted to a sodium-containing prior art composition. None of the subjects experienced any gastrointestinal bleeding.

Example 3

Several portions of an effervescent analgesic composition identified by the code "Formula L" were prepared, each portion individually containing:

Mg.
Acetylsalicylic acid ---------------------------- 325
Citric acid, anhydrous -------------------------- 127
Calcium carbonate ------------------------------- 300
Magnesium carbonate ----------------------------- 125

This composition contained 0.3 mole of citric acid per mole of acetylsalicylic acid and when reacted in water provided a solution pH of 6.0.

Three portions of the above "Formula L" were reacted in water to form a total analgesic dosage level equivalent to 975 mg. of acetylsalicylic acid. Such overall dosage was given individually to three human subjects according to the schedule described in Example 1 above.

A week later three portions of the "Commercial" composition described in Example 2 above having an identical overall acetylsalicylic acid content to that of "Formula L" above were dissolved in water. Such overall dosage was given individually to the three human subjects according to the schedule described in Example 1 above.

Periodic blood salicylate levels were measured, and the results are shown in the following table wherein the results each represent the numerical average value for the three subjects:

| Composition | Blood Salicylate Levels, mg./liter | | | | |
|---|---|---|---|---|---|
| | 15 min. | 30 min. | 45 min. | 24 hr. | 48 hr. |
| Formula L | 49 | 71 | 76 | 95 | 107 |
| Commercial | 21 | 44 | 61 | 35 | 13 |

None of the subjects experienced any gastrointestinal bleeding:

Example 4

Several portions of an effervescent analgesic composition identified by "P–2" were prepared, each portion individually containing:

Mg.
Acetylsalicylic acid ---------------------------- 648
Malic acid -------------------------------------- 402.3
Magnesium carbonate ----------------------------- 171.2
Calcium carbonate ------------------------------- 406.4
Mixture of lemon and grapefruit flavoring and
    cyclamate and saccharin sweeteners ---------- 202

This composition contained 0.83 mole of malic acid per mole of acetylsalicylic acid and when reacted in water provided a solution pH of 5.0.

A single portion of composition "P–2" reacted in water was given to each of three human subjects according to the schedule described in Example 2 above. Periodic blood salicylate levels were measured, and the results are shown in the following table wherein the results each represent the numerical average value for the three subjects:

Blood salicylate levels                           Mg./liter
    15 min. ------------------------------------- 23
    30 min. ------------------------------------- 39
    45 min. ------------------------------------- 43
    24 hr. -------------------------------------- 65
    48 hr. -------------------------------------- 92

The above results show that a composition of the present invention using a polybasic organic acid other than citric acid also enables blood salicylate levels to be maintained at desirably high values. None of the subjects experienced any gastrointestinal bleeding.

Example 5

A single portion of an effervescent analgesic composition was prepared containing:

| | Mg. |
|---|---|
| Acetylsalicylic acid | 648 |
| Fumaric acid CWS [1] | 346.9 |
| Magnesium carbonate | 171.2 |
| Calcium carbonate | 406.4 |
| Mixture of lemon and grapefruit flavoring and cyclamate and saccharin sweeteners | 202 |

[1] Fumaric acid CWS is a cold water soluble form of fumaric acid treated with 0.3 weight percent dioctyl sulfosuccinate salts in order to increase its aqueous dissolution rate.

This composition contained 0.83 mole of fumaric acid per mole of acetylsalicylic acid and when reacted in water provided a solution pH of 4.55.

This composition can be employed to maintain high blood salicylate levels during prolonged analgesic therapy.

Example 6

Various mixtures of citric acid, acetylsalicylic acid, calcium carbonate, potassium bicarbonate and magnesium carbonate were individually added to separate 90 ml. portions of water at 16° C. The resulting reacted aqueous mixtures were stirred for five (5) minutes and the solution pH values were measured. The results are shown below in the following table wherein "ASA" refers to acetylsalicylic acid. The amounts of each of the mixture components are expressed in milligrams and in millimoles.

| Sample No. | Citric acid mg. (millimoles) | ASA mg. (millimoles) | $CaCO_3$ mg. (millimoles) | $KHCO_3$ mg. (millimoles) | $MgCO_3$ mg. (millimoles) | pH |
|---|---|---|---|---|---|---|
| 1 | 200 (1.04) | 325 (1.8) | 82 (0.82) | 164 (1.64) | 69 (0.82) | 4.85 |
| 2 | 200 (1.04) | 325 (1.8) | 123 (1.23) | 247 (2.47) | | 5.10 |
| 3 | 200 (1.04) | 325 (1.8) | 123 | | 104 (1.23) | 4.55 |
| 4 | 200 (1.04) | 325 (1.8) | | 247 | 104 | 5.00 |
| 5 | 200 (1.04) | 325 (1.8) | 247 (2.47) | | | 4.62 |
| 6 | 200 (1.04) | 325 (1.8) | | 493 (4.93) | | 5.91 |
| 7 | 200 (1.04) | 325 (1.8) | | | 208 (2.47) | 4.65 |
| 8 | 100 (0.52) | 325 (1.8) | 82 | 164 | 69 | 6.15 |
| 9 | 100 (0.52) | 325 (1.8) | 123 | 247 | | 5.90 |
| 10 | 100 (0.52) | 325 (1.8) | 123 | | 104 | 5.80 |
| 11 | 100 (0.52) | 325 (1.8) | | 247 | 104 | 6.45 |
| 12 | 100 (0.52) | 325 (1.8) | 247 | | | 5.10 |
| 13 | 100 (0.52) | 325 (1.8) | | 493 | | 6.50 |
| 14 | 100 (0.52) | 325 (1.8) | | | 208 | 6.30 |
| 15 | 300 (1.56) | 325 (1.8) | 108 (1.08) | 217 (2.17) | 91 (1.08) | 5.30 |
| 16 | 300 (1.56) | 325 (1.8) | 162 (1.62) | 325 (3.25) | | 5.43 |
| 17 | 300 (1.56) | 325 (1.8) | 162 | | 137 (1.63) | 5.00 |
| 18 | 300 (1.56) | 325 (1.8) | | 325 | 137 | 6.00 |
| 19 | 300 (1.56) | 325 (1.8) | 325 (3.25) | | | 4.75 |
| 20 | 300 (1.56) | 325 (1.8) | | 650 (6.50) | | 5.95 |
| 21 | 300 (1.56) | 325 (1.8) | | | 274 (3.25) | 4.88 |

In the above runs including citric acid at the 200 mg. and 300 mg. levels, wherein the citric acid is present in 0.58 to 0.87 mole per mole of acetylsalicylic acid, the total amounts of sodium-free alkaline material are in stoichiometric quantities to react with the total citric acid and acetylsalicylic acid present. In the above runs including citric acid at the 100 mg. level, wherein the citric acid is present in 0.29 mole per mole of acetylsalicylic acid, the total amounts of sodium-free alkaline materials are in excess of the stoichiometric quantities required to react with the total citric acid and acetylsalicylic acid present. These data clearly show that compositions of the present invention having from about 0.25 to about 0.9 mole of polybasic organic acid per mole of acetylsalicylic acid and containing at least one sodium-free alkali metal bicarbonate or alkaline earth carbonate can produce aqueous solutions having pH in the range from about 4.5 to about 7.5, preferably from about 4.5 to about 6.75. These compositions can also be employed to maintain high blood salicylate levels during prolonged analgesic therapy.

Alkali metal carbonates can also be employed in place of the alkali metal bicarbonate of the above example and still be within the scope of the present invention.

What is claimed is:

1. A substantially water-soluble effervescent analgesic composition useful for prolonged therapy at elevated analgesic levels comprising from about 320 to about 1300 milligrams acetylsalicylic acid, from about 0.25 to about 2.98 moles of a polybasic organic acid per mole of acetylsalicylic acid, and a sodium-free alkaline compound selected from the class consisting of alkali metal bicarbonates, alkali metal carbonates, alkaline earth carbonates and mixtures thereof, said sodium-free alkaline compound being present in an amount such that when said effervescent composition is placed in water, said alkaline compound reacts with said acetylsalicylic acid and said polybasic organic acid to form sodium-free alkaline salts of said acids.

2. An analgesic composition according to claim 1 wherein the ingredients are present in sufficient amounts to provide a solution pH of from about 4.5 to about 7.5 when said composition is placed in water.

3. An analgesic composition according to claim 1 which when reacted in water is used in analgesic dosage levels equivalent to from about 645 to about 1300 milligrams of acetylsalicylic acid.

4. An analgesic composition according to claim 1 wherein the polybasic organic acid is present in an amount from about 0.25 to about 0.9 mole of polybasic organic acid per mole of acetylsalicylic acid.

5. An analgesic compound according to claim 1 wherein the polybasic organic acid is citric acid.

6. An analgesic compound according to claim 1 comprising ingredients in the molar proportional amounts of one mole of acetylsalicylic acid, 0.83 mole of citric acid, 1.67 moles of calcium carbonate and 0.82 mole of magnesium carbonate.

7. An analgesic compound according to claim 1 wherein the polybasic organic acid is fumaric acid.

References Cited

UNITED STATES PATENTS

| | | | |
|---|---|---|---|
| 1,486,002 | 3/1924 | Alsleben | 424—234 |
| 2,840,506 | 6/1958 | Goodfriend | 424—234 |
| 2,990,328 | 6/1961 | Lincoln | 424—234 |

OTHER REFERENCES

Carlo et al., Journ. Amer. Pharm. Assoc., vol. 44, pp. 396–399 (1955).

ALBERT T. MEYERS, Primary Examiner

S. J. FRIEDMAN, Assistant Examiner

U.S. Cl. X.R.

424—234